United States Patent
Findlay

(10) Patent No.: US 8,092,226 B2
(45) Date of Patent: Jan. 10, 2012

(54) GAME FOR EDUCATING USERS REGARDING MEDICAL CONDITIONS

(75) Inventor: Anthony John Findlay, Neutral Bay (AU)

(73) Assignee: Big Red Frog Limited, Guernsey (GB)

( * ) Notice: Subject to any disclaimer, the term of this patent is extended or adjusted under 35 U.S.C. 154(b) by 1178 days.

(21) Appl. No.: 11/253,283

(22) Filed: Oct. 18, 2005

(65) Prior Publication Data

US 2006/0105825 A1    May 18, 2006

Related U.S. Application Data

(63) Continuation of application No. PCT/AU2004/000537, filed on Apr. 23, 2004.

(30) Foreign Application Priority Data

Apr. 24, 2003 (AU) ................................ 2003901956

(51) Int. Cl.
*G09B 23/28* (2006.01)
*G09B 3/00* (2006.01)
*A63F 13/00* (2006.01)

(52) U.S. Cl. ........ 434/262; 434/118; 434/128; 434/236; 434/308; 434/322; 463/1; 463/9

(58) Field of Classification Search ................ 703/11; 463/4, 1, 9; 434/219, 262, 267, 268, 272, 434/350, 118, 128, 236, 308, 322
See application file for complete search history.

(56) References Cited

U.S. PATENT DOCUMENTS

| 5,151,586 | A | | 9/1992 | Sato et al. |
| 5,215,309 | A | | 6/1993 | Joel |
| 5,228,860 | A | | 7/1993 | Hale |
| 5,307,263 | A | | 4/1994 | Brown |
| 5,556,100 | A | | 9/1996 | Taylor et al. |
| 5,569,212 | A | | 10/1996 | Brown |
| 5,601,435 | A | | 2/1997 | Quy |
| 5,678,571 | A | * | 10/1997 | Brown .......................... 128/898 |
| 5,720,733 | A | | 2/1998 | Brown |
| 5,730,654 | A | * | 3/1998 | Brown .............................. 463/1 |

(Continued)

FOREIGN PATENT DOCUMENTS

JP    2000-014927    1/2000

(Continued)

OTHER PUBLICATIONS

International Search Report for International Application No. PCT/AU2004/000537.

(Continued)

*Primary Examiner* — Kang Hu
(74) *Attorney, Agent, or Firm* — Knobbe Martens Olson & Bear LLP

(57) ABSTRACT

A game is provided for teaching users about conditions affecting the human body. The game may include a game zone representing a body inflicted with a condition, a number of opponents representing attributes of the condition, and at least one character representing the user. The user may be asked a number of questions, and be required to answer the questions to obtain one or more weapons for overcoming the opponents. The story line of the game may represent the progression of the condition, and may require elimination of at least some of the opponents in order to overcome the condition and win the game.

23 Claims, 4 Drawing Sheets

U.S. PATENT DOCUMENTS

| | | | |
|---|---|---|---|
| 5,736,986 A * | 4/1998 | Sever, Jr. | 345/419 |
| 5,782,814 A | 7/1998 | Brown et al. | |
| 5,791,907 A * | 8/1998 | Ramshaw et al. | 434/262 |
| 5,792,117 A | 8/1998 | Brown | |
| 5,794,219 A | 8/1998 | Brown | |
| 5,813,863 A * | 9/1998 | Sloane et al. | 434/236 |
| 5,822,715 A | 10/1998 | Worthington et al. | |
| 5,828,943 A | 10/1998 | Brown | |
| 5,832,448 A | 11/1998 | Brown | |
| 5,876,351 A * | 3/1999 | Rohde | 600/523 |
| 5,879,163 A | 3/1999 | Brown et al. | |
| 5,887,133 A | 3/1999 | Brown et al. | |
| 5,897,493 A | 4/1999 | Brown | |
| 5,899,855 A | 5/1999 | Brown | |
| 5,913,310 A | 6/1999 | Brown | |
| 5,918,603 A | 7/1999 | Brown | |
| 5,933,136 A | 8/1999 | Brown | |
| 5,940,801 A | 8/1999 | Brown | |
| 5,951,300 A * | 9/1999 | Brown | 434/236 |
| 5,956,501 A | 9/1999 | Brown | |
| 5,960,403 A | 9/1999 | Brown | |
| 5,985,559 A | 11/1999 | Brown | |
| 5,997,476 A | 12/1999 | Brown | |
| 6,023,686 A | 2/2000 | Brown | |
| 6,032,119 A | 2/2000 | Brown et al. | |
| 6,068,615 A | 5/2000 | Brown et al. | |
| 6,074,213 A * | 6/2000 | Hon | 434/262 |
| 6,101,478 A | 8/2000 | Brown | |
| 6,110,148 A | 8/2000 | Brow et al. | |
| 6,113,578 A | 9/2000 | Brown | |
| 6,144,837 A | 11/2000 | Quy | |
| 6,167,362 A * | 12/2000 | Brown et al. | 703/11 |
| 6,213,872 B1 * | 4/2001 | Harada et al. | 463/7 |
| 6,251,010 B1 | 6/2001 | Tajiri et al. | |
| 6,267,677 B1 | 7/2001 | Tajiri et al. | |
| 6,418,298 B1 * | 7/2002 | Sonnenfeld | 434/350 |
| 6,482,092 B1 | 11/2002 | Tajiri et al. | |
| 6,595,850 B2 * | 7/2003 | Yamaki | 463/1 |
| 6,595,858 B1 | 7/2003 | Tajiri et al. | |
| 6,616,532 B2 * | 9/2003 | Albrecht | 463/29 |
| 6,692,258 B1 * | 2/2004 | Kurzweil et al. | 434/262 |
| 6,739,877 B2 * | 5/2004 | Bailey et al. | 434/262 |
| 6,918,769 B2 * | 7/2005 | Rink | 434/247 |
| 7,229,288 B2 * | 6/2007 | Stuart et al. | 434/262 |
| 2003/0008714 A1 | 1/2003 | Tajiri | |
| 2004/0043368 A1 * | 3/2004 | Hsieh et al. | 434/262 |

FOREIGN PATENT DOCUMENTS

| | | |
|---|---|---|
| WO | WO 99/32201 | 7/1999 |

OTHER PUBLICATIONS

Written Opinion for International Application No. PCT/AU2004/000537.

* cited by examiner

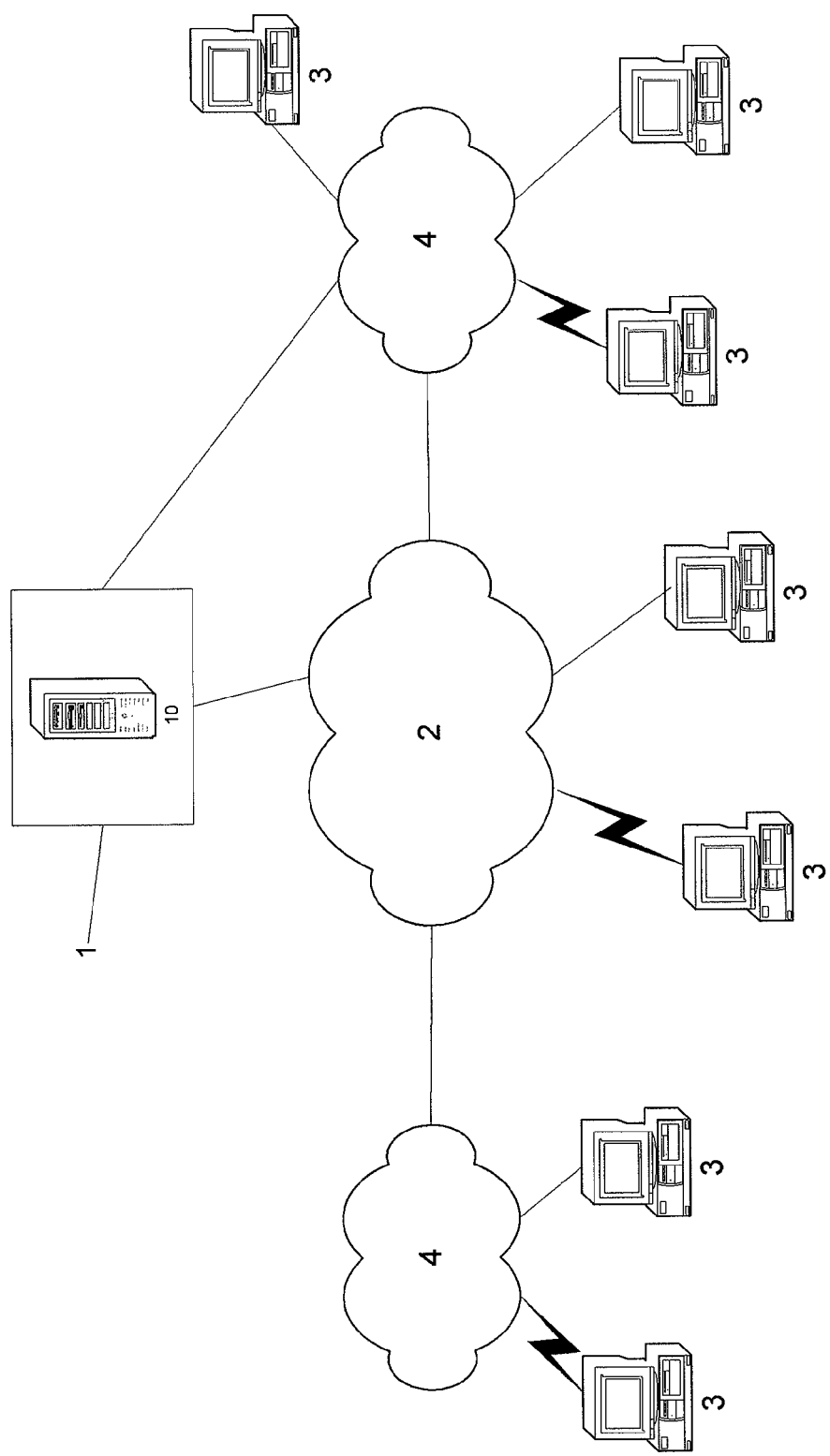

GAME FOR EDUCATING USERS REGARDING MEDICAL CONDITIONS

CROSS-REFERENCE TO RELATED APPLICATIONS

This application is a continuation under 35 U.S.C. §120 of PCT Application No. PCT/AU2004/000537, filed Apr. 23, 2004 and published in English, which claims priority to Australian Application No. 2003901956, filed on Apr. 24, 2003, and U.S. Application No. 60/466,511, filed on Apr. 29, 2003. Each of the above applications are hereby incorporated by reference in their entirety.

BACKGROUND

1. Field of the Invention

Embodiments of the present invention relate to a game for teaching users about conditions affecting the human body, and in particular to a game for teaching children regarding conditions such as medical conditions.

2. Description of the Related Art

The reference to any related art in this specification is not, and should not be taken as, acknowledgement or any form of suggestion that the prior art forms part of the common general knowledge.

Currently a number of problems exist in teaching the general public, and in particular, children regarding the effects and treatments for medical conditions, such as obesity, or the like.

Some of these problems stem from the difficulty in making explanations simple enough to be understood by a child or other individual having only a poor understanding of general biological and physiological concepts. This is because many conditions can only be explained in terms of their effect on the human body and this is often difficult for people to visualize.

In the case of children, it is also difficult to teach children to understand issues from another persons point of view. Thus, it is difficult for a child to understand the full impacts of medical conditions, if the characters themselves do not suffer from it.

A further problem with teaching children is that of a poor concentration span, especially for subjects in which the characters have no interest.

In contrast to this however, children seem to have a phenomenal concentration span when it comes to computer games. However, the playing of computer games is in itself generally considered to be detrimental to a child's development.

SUMMARY OF THE INVENTION

In a first embodiment a game is provided for teaching users about conditions affecting the human body, the game including:
a) A game zone representing a body inflicted with a condition;
b) A number of opponents, the opponents representing attributes of the condition;
c) A character representing the user;
d) A number of questions, the user being required to supply answers to the questions;
e) One or more weapons for overcoming the opponents, the weapons being awarded in response to correctly answered questions; and,
f) A storyline representing the progression of the condition, the character being required to eliminate at least some of the opponents in order to allow the user to overcome the condition and win the game.

The opponents can include at least one of:
a) Entities;
b) Puzzles; and,
c) Tasks.

The weapons may include at least one of:
a) Arms for destroying the entities;
b) Puzzle solutions for overcoming the puzzles; and,
c) Bonus items for completing the tasks.

At least some of the weapons may be opponent specific, such that weapon will only affect a predetermined opponent.

At least some of the weapons are usually associated with respective cure attributes for overcoming the disease.

The weapons associated with respective cure attributes may be awarded in response to answering a question about the respective cure attribute.

The game typically includes a number of levels, each level may be set in a different region of the body. Each level generally includes opponents corresponding to a respective aspect of the condition.

The game preferably further includes a knowledge center accessible by the user, the knowledge center including at least sufficient information to allow the questions to be answered. The knowledge center including references to external materials, such as web-sites, text books, or the like.

The knowledge center may include redundant materials.

The game may be implemented using a processing system, the processing system including:
a) A store for storing game data representing the game;
b) An input for receiving input commands from the user;
c) A display, for providing a game representation to the user; and,
d) A processor, the processor being adapted to:
  i) Determine a current game status;
  ii) Generate an image in accordance with the current game status, the image being displayed on the display;
  iii) Modify the games status in accordance with input commands received from the user; and,
  iv) Repeat steps ii) and iii) as required.

The processor can be adapted to:
a) Determine if the condition has overcome the body; and,
b) End the game in response to a successful determination.

The processor can be adapted to:
a) Generate the game zone, the game zone being a three-dimensional representation of the inside of the human body;
b) Move the character around the game zone in response to input commands from the user; and,
c) Generate an image representing the current location of the character in the body.

The image is typically a rendered 3-D image.

The game zone can include one or more knowledge centers provided at respective locations.

The processor may be adapted to:
a) Periodically generate selected questions;
b) Present the questions to the user on the display; and,
c) Determine any answers in accordance with input commands received from the user;
d) Determine if any correct answers have been provided; and,
e) Award the character with one or more weapons in response to a positive determination.

The game data can include an indication of the story line, the processor being adapted to update the game status in accordance with the story line.

The conditions can be medical conditions, although the condition may be any condition affecting the body in an adverse manner.

The user is typically required to gain a knowledge of at least one technique of overcoming the condition in order to win the game.

In a second embodiment a computer program product is provided for teaching users about conditions affecting the human body, the computer program product including executable code which when executed on a suitable processing system causes the processing system to implement the game of the first broad form of the invention.

In a third embodiment a method of creating a game is provided for teaching users about conditions affecting the human body, the method including defining:
 a) A game zone representing a body inflicted with a condition;
 b) A number of opponents, the opponents representing attributes of the condition;
 c) A character representing the user;
 d) A number of questions, the user being required to supply answers to the questions;
 e) One or more weapons for overcoming the opponents, the weapons being awarded in response to correctly answered questions; and,
 f) A storyline representing the progression of the condition, the character being required to eliminate at least some of the opponents in order to allow the user to overcome the condition and win the game.

The game can be a game according to the first embodiment.

The game can be defined using a processing system, the method including causing the processing system to generate computer executable code which when executed on a suitable processing system cause the processing to implement the game.

In a fourth embodiment a computer program product is provided for creating a game for teaching users about conditions affecting the human body, the computer program product including executable code which when executed on a suitable processing system causes the processing system to implement the method of the third broad form of the invention.

BRIEF DESCRIPTION OF THE DRAWINGS

An embodiment will now be described with reference to the accompanying drawings, in which:

FIG. 4 is a schematic diagram of an architecture for use in creating or playing games; and,

DETAILED DESCRIPTION OF CERTAIN EMBODIMENTS

An example of a game will now be described.

In this example, the embodiment provides a technique for teaching children regarding the effect of diseases, medical conditions, or the like using a game. In particular, the game operates by modelling a disease or other adverse condition, with negative impacts of the disease or condition representing opponents that need to be overcome by the game player in order to win the game.

The game is advantageously implemented as applications software which when executed by a suitable processing system provides an interactive game. The actions of the game player affect the outcome of the game, and hence the progression of the disease or condition. As the game generally utilizes a story line based on the effects of the disease or condition on the human body, the human body can represent a game play area allowing the game player to explore the effects of the disease on the body during the game play.

In this context, the term disease will be taken to represent any condition which has a negative impact on the human body, such as effects of a poor lifestyle, poor diet, or the effects of specific medical condition or disease such as obesity, heart disease, the effects of drug abuse, or the like. Thus, the negative impacts which form the opponents may represent factors in the progression of the disease, effects of the disease, or the like. Thus in the case of obesity for example opponents may represent effects such as diabetes, heart disease, or the like.

In any event, the game player is generally provided with weapons which may be used to overcome the opponents and thereby return the human body represented by the game play area to good health. In order to achieve this, the weapons may be related to positive actions, including any action that may be used to overcome the negative impacts representing the opponents, such as curative effects, the effect of medication, changes in lifestyle, or the like.

This relationships can be achieved in a number of ways, such as by having the weapons represent respective positive actions, or by providing weapons in response to the demonstration of knowledge regarding a positive action, as will be explained in more detail below.

Figure 1:
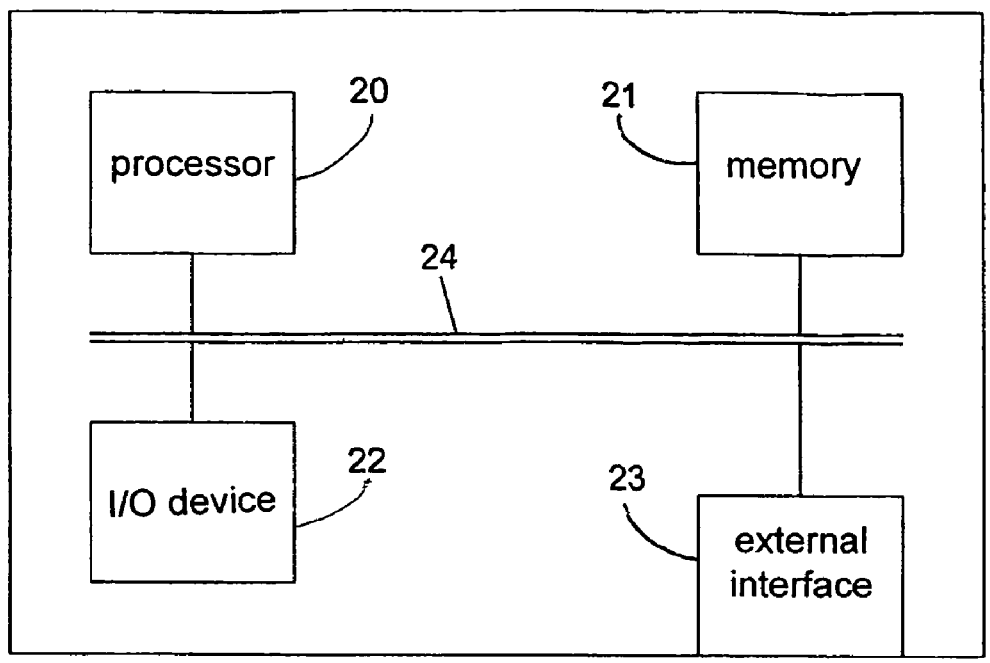
FIG. 1 is a schematic diagram of a processing system adapted for use in creating or playing games.

In any event, the game may be implemented as applications software for execution by a processing system. An example of a suitable processing system 10 is shown in FIG. 1, which includes a processor 20, a memory 21, an input/output (I/O) device 22, such as a keyboard, mouse, joystick, game pad and display, and an optional external interface 23, coupled together via a bus 24.

In use the processing system is adapted to execute the applications software and generate a representation of the game for display to the game player. The processing system 10 then operates to receive input commands from the game player and determine how this affects the current status of the game, updating the representation as required. Thus, it will be appreciated that the processing system may be any form of processing system adapted to generate and/or execute applications software, depending on its usage. This may include for example, a computer, a server, a games machine, suitably programmed hardware, or the like.

Figure 2:
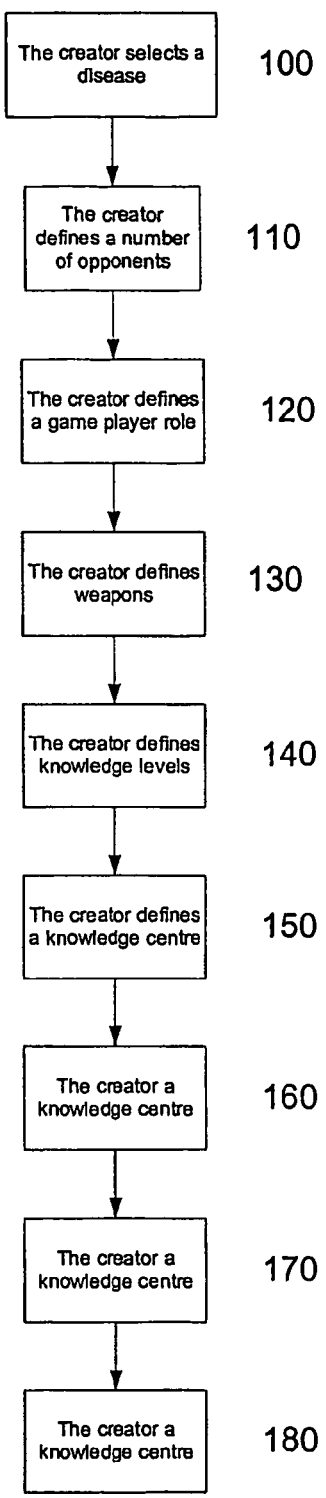
FIG. 2 is a flow chart of the process of creating a game.

An example of the manner in which games of this form may be created will now be described with reference to FIG. 2.

In particular, at step 100 a game creator selects a disease to be modelled by the game. As mentioned above, the term disease includes any event which will be detrimental to the health of an individual, such as specific medical conditions, or the like.

At step 110, the game creator determines negative impacts of the disease, and uses these to define a number of opponents. In this sense, opponents will represent anything a player must overcome in order to win the game. Accordingly, while opponents will generally be in the form of individual entities that the game player must defeat, opponents may also be in the form of particular tasks, puzzles or obstacles that must be solved or overcome in order to win the game.

At step 120, the game creator then defines a role for the game player in the defense of the body under attack. This is generally achieved by defining a character to be played by the game player, with this character being either internal or external depending on the particular scenario. The reason for defining the game player to be a character directly involved in the scenario is due to the difficulty children have in understanding concepts applied to third parties. Thus, it is difficult for children to understand the effects of actions on other people. Accordingly, by involving the game player in the first person perspective, this helps immerse the child in the game, thereby improving the ability of the game to tech the child concepts.

At step 130, the game creator defines weapons, including classical gun type weapons, bonus items or the like, which may be used to overcome opponents. Thus, the weapons may represent a specific form of action that can be taken on the body to overcome the opponents. This can be in the form of direct acts such as shooting opponent entities, as well using bonus items or knowledge to overcoming puzzles or the like. This will be described in more detail below.

At step 140 the game creator defines a number of knowledge levels which must be satisfied. This is usually achieved by having the game creator define questions which must be answered in order for the game player to obtain weapons and/or bonus items, progress to the next stage of the game, or the like. The knowledge levels will relate to various techniques for overcoming or avoiding the disease selected at step 100.

At step 150 the game creator defines a knowledge center. The knowledge center contains all the information which will be required by the game player in order to satisfy all the knowledge levels and thereby allow the game to be finished. This may include for example answers to questions, or the solutions for overcoming opponents. The knowledge center may also include redundant information to help further test the attention of the player.

In any event, at step 160 the game creator operates to define a story line representing the effect of the disease and the associated treatment. Thus the story line is devised to allow a successful conclusion to the game to represent the recovery of the body affected by the disease. Failure to complete the story line generally indicates a lack of knowledge and therefore represents victory of the disease, typically leading to death of the body, or some other adverse outcome.

At step 170 the game creator typically operates to define a number of levels, with each level have a respective objective with respect to either the treatment, the disease, or a respective body part. This usually therefore represents a respective portion of the story line.

Once this has been completed, the game creator can operate to define applications software at step 180.

It will be appreciated that while the above describes a sequence of steps, these steps be performed in any order, simultaneously, or iteratively, in order to allow a coherent story and set of questions to be developed. This process will generally require input from a medically qualified expert and/or an education specialist in order to ensure that the knowledge gained by the game player is medically correct, and directed at a suitable learning age group.

The operation to create applications software will be understood by a person skilled in the art and will not therefore be described in any detail. However, the process would typically include generating data representing the game zone, which as mentioned above will typically be modelled on a portion of the human body. Data defining the opponents, the character, any weapons, the knowledge, questions and the general story line will also be created to allow the processing system to integrate these in the form of a game in accordance with suitable instructions. The creation of the applications software may be performed using a processing system, such as the processing system 10 described in FIG. 1.

Figure 3:
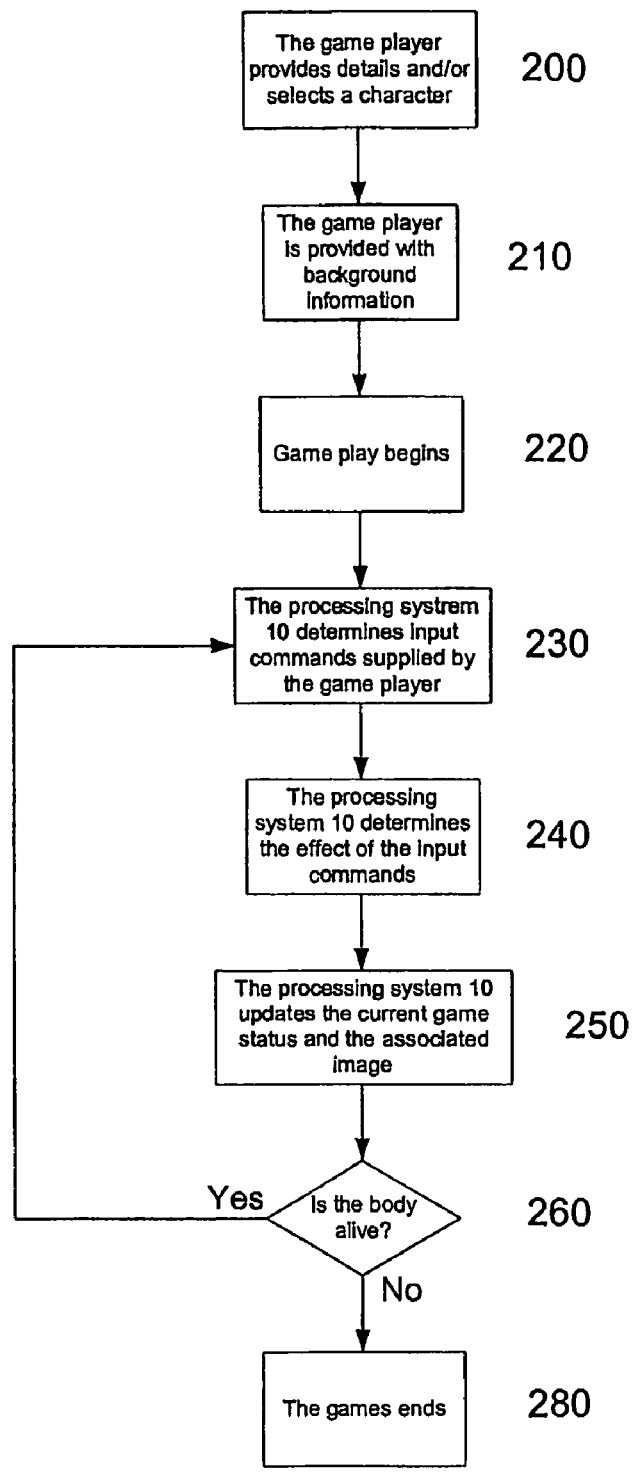
FIG. 3 is a flow chart of the process of playing a game.

An example of the game play process will now be described with reference to FIG. 3.

In particular, at step 200 the game player typically enters details of themselves and/or selects a character to play. While this step is not essential depending on the actual game implementation, it is performed in order to allow the game player to establish some form of meaningful connection with the game. In particular, this allows the character to be named after the game player, as well as allowing a character to be selected from a list of characters.

In any event, for the purpose of the remainder of the game, the game player will take on the role of the character such that the character acts in accordance with input commands from the game player, allowing the game player to interact with the gaming environment.

At step 210 the game player will typically be provided with background information. This will usually be in the form of an outline of the disease represented by the particular game, as well as any other information required to provide the game player with information regarding the context of the game.

At step 220 game play begins.

In order to achieve this, the processing system will generally operate to generate a graphical user interface (GUI) presented to the game player on the I/O device 22. The GUI will include an image representation of the game play area, together with an indication of the current game status. Thus the processing system 10 will determine the level at which the game is starting and determine the appearance of the level from gaming data stored in the memory 21, and then generate an image representing this on the GUI.

As mentioned above, the game play is set in a game play area representing the inside of a body suffering from the respective disease. The game status includes information such as the location of the character within the body, and the body health level. This will be described in more detail below with respect to a specific example. In any event, it will be appreciated that the representation will therefore be intended to represent a portion of the inside of the human body. However to make this more accessible to children, the image may be only broadly representative and can be based heavily on analogies, such that organs for example may appear as analogous elements, and not have the appearance of actual organs.

At step 230 the processing system 10 will determine any input commands provided by the game player and then operate to determine the effects of these at step 240. This will be achieved in accordance with the applications software, as will be appreciated by persons skilled in the art. Thus, for example, the processor 20 will determine the current game status, and determine the effect on this of the input commands. This will be defined in the story-line and other instructions which form part of the game data stored in the store.

In any event, the processing system 10 will then modify the game status and in particular the image provided to the player on the display 22 at step 250.

At step 260 the processing system 10 will determine if the body representing the playing area is still alive and if so returns to step 230 to determine any further input commands from the player. Otherwise the game ends at step 280.

Additional details of various features of the applications software will now be described.

Game Structure

In one embodiment the game structure involves representing the human body as game zone in which a game is played. The game will represent the progression of a disease, with the game player being required to overcome opponents and thereby overcome the disease and return the body to a healthy condition.

In one embodiment the game may be divided into a number of levels, with each level having one or more predefined learning objectives. The learning objectives when combined provide the game player with an understanding of the disease, together with details of how it may be treated and/or avoided. Completion of the learning objectives will allow the user to progress through to the end of the game, and thereby win the game.

Game Zone

As described above, the game zone may generally represent a human body. The effects of this is that during the game the character adopted by the game player will be required to move through the body in order to complete all the levels in the game. Movement through the body may typically be achieved in a number of manners depending on the disease and in particular, the nature of the character. Thus, for example, the character may represent a hormone or white blood cell, in which case movement through the game zone will primarily be through the blood stream. However, any suitable technique may be used.

The game zone is typically subdivided into a number of gaming regions, which are areas within the body within which interaction occurs between the character and the body or disease. This allows the game regions to be defined in detail, with other regions including only enough detail to allow travel therebetween. In any event, it will be appreciated that that each of the regions may correspond to a different level within the game.

Characters

In order to allow the game player to experience the game from a first person perspective, the game player adopts the role of a character.

The character may form part of the body's own internal defense mechanism, such as a white blood cell, hormone, or the like, or alternatively may be an external entity introduced into the game play area. This can be entered into the story line by having for example the player acting as a medical professional and being shrunk and placed into the body of a patient in order to help the patient overcome the respective condition.

In general one or more characters may be selected by the game player. This helps increase the game players interest in the game, by allowing the game to be approached from a different perspective each time it is played. This also allows multiple player games to occur, with a number of game players participating in the same game as different characters. In general this play would be cooperative, but this is not essential.

In any event, the character may be provided with specific abilities as appropriate. This may therefore correspond to restrictions on the movement and impact the character may have on the gaming zone or the like. This will typically allow the character to traverse the game zone in a predetermined manner, depending on the scenario. Thus, the character may be able to move between organs through the blood stream, with the organs corresponding to gaming regions. In this case, once the gaming region is reached, additional movement through the gaming region may be possible.

The processing system can be adapted to implement A.I. (artificial intelligence) algorithms to aid control of the character.

Additional characters may be provided to assist the player in the game. These could take the form for example of attributes of the bodies defense system, hormones, or the like, and will generally provide information, specific knowledge, or clues to puzzle solutions in order to aid the player.

Additional characters are generally controlled by the processing system 10, in accordance with A.I. algorithms and/or the story line. However, as an alternative, the role of the additional characters could be performed by other game players in a multi-player game environment.

Opponents

The opponents are intended to represent attributes or negative effects of the disease. Thus for example, opponents may represent aspects of the disease which have an impact on the body. In the case of obesity, for example, opponents may be based on factors such as insulin levels, free radical levels, cholesterol levels, or the like.

In general, each opponent may be formed from a respective entity which the player must destroy. Thus, in the example of obesity, an opponent entity representing high levels of cortisol in the body could be represented by a high incidence of cortisol entities which the player must overcome with appropriate weapons and knowledge.

It is also possible for opponents to be in the form of puzzles which must be solved by the game player. The solving of puzzles can represent knowledge of particular ways in which the disease may be combated, or may require that a bonus item is obtained.

In general, the processing system will operate some form of A.I. (artificial intelligence) algorithms to control the actions of the opponents, and this behaviour can be adapted to model the effects of the respective attributes or negative effects of the disease.

Weapons

Weapons may be in a number of forms including:
Traditional weapons;
Puzzle solutions; and
Bonus items.

In general, weapons are provided to the user in response to the demonstration of specific knowledge regarding the disease. Thus, the game player may be asked questions at various stages through the progression of the game, with the correct answers rewarding the game player with a predetermined number of weapons, in any of the above forms.

This technique means that the game player will be unable to complete the game without at least reaching a predetermined level of knowledge regarding the disease. It will be appreciate that the questions may be contextually relevant to the weapons provided, or the current scenario in the game. Thus for example, if the next opponent for the game player to deal with relates to a specific portion of the disease, the question may relate to a possible cure for this portion of the disease.

In any event, the weapons may be used in order to overcome the opponents. Thus, a puzzle solution will be associated with a respective puzzle. Similarly, bonus items, such as power ups, fuel bonuses, energy bonuses, or the like, may be required to allow the user to progress to different stages within a level or between levels themselves. This may be achieved for example by sealing off regions of a level and only making these accessible once the player has obtained a respective bonus item.

Finally, the traditional weapons, which are generally in the form of shooting weapons, such as lasers, guns, or the like, may be utilized to destroy opponent entities. The manner in which this occurs may again depend on the implementation of the invention and in particular, the respective disease being modelled.

Thus, for example, weapons may be opponent specific, such that a particular weapon may only target a particular opponent. This can be used to help reinforce the knowledge demonstrated in answering the defined questions. Thus for example, the opponent may correspond to a high level of insulin. In this case, the question could be: "How can high insulin levels be addressed?", with the answer being "An educated eating plan". In this case, the weapon can be an energy reducer, with this having the ability to lower available energy. Thus for example, the weapon may correspond to medication, or the like.

Alternatively the weapons may be standard weapons in the form of guns or the like only a loose association with a particular curative effect. However, it will be appreciated that the use of a curative effect as a weapon will help reinforce concepts of the game player.

Center

The knowledge center is used to provide the game player with knowledge required to answer the questions. This will generally be accessible under a number of different circumstances and in a number of different manners depending on the respective game implementation.

Thus for example, the knowledge center may represent information provided to the game player at the start of every level. This can be in the form of written or spoken information which the game player must consider before commencing the level. In this case, the questions could be provided after the knowledge center has been accessed, or throughout the level at appropriate times.

Alternatively, the knowledge center may represent a specific location in the game zone which the character may visit as required in order to obtain more information. Finally, the knowledge center may represent an external entity, such as a medical professional, or the like, which is providing the character with information.

In any of the above mentioned case, the information contained in the knowledge center may be accessed as searchable information, or as information provided as a one off statement.

It will be appreciated that the knowledge center may also include redundant information, thereby ensuring that the game player is paying attention and is correctly absorbing the information.

Difficulty Levels

In general games have difficulty levels to make the game more interesting to a wide range of users. Thus, for example, when first playing a game, many individuals will begin with a low difficulty setting to allow them to progress through the game relatively easily. However, as the player becomes used to the game, the easy setting will typically become boring, and a more difficult setting, such as one in which additional enemies exist will be required.

A similar process may be implemented in the present invention. In this case, the difficulty settings would reflect not only the difficulty of playing the game, but would also require the demonstration of an increased level of knowledge in order to complete the game. Thus, for example, questions could become harder, and/or more frequent. An increased knowledge center may also be required.

This allows a single game to teach for the effects of disease to a wide range of ages. For example, it is possible that two versions of the game can be provided, with an easier version being supplied to 5 to 9 year olds and a more complex version to 10 to 16 years year olds.

Story Line

The story line is used to guide the game play, and define the purpose of the game. Thus the story line will include details of events that will occur in the game, the character, the opponents, weapons, and the like.

An example story line for a specific game is shown in Appendix A.

Architectures

It will be appreciated that the above game may be achieved in a number of different manners. Thus, for example, a respective processing system 10 may be provided for each game player that is to use the system. This could be achieved by supplying respective applications software for each player's computer system, or the like, for example on a transportable media, or via download.

In the case of downloading the game, if modifications to the game are determined, these could be made available through program updates or the like, which again may be made available in a number of manners. However, alternative architectures, such as distributed architectures, or the like, may also be implemented.

An example of this is shown in FIG. 4 a base station 1 coupled to a number of end stations 3 via a communications network 2, such as the Internet, and/or via communications networks 4, such as local area networks (LANs) 4. Thus it will be appreciated that the LANs 4 may form an internal network at a school, learning center, medical institution, or the like, depending on the use of the game.

In use the end stations 3 are adapted to communicate with other ones of the end stations, or the base station 1. It will be appreciated that this allows a number of different forms of end station 3 to be used. However, typically the end station would include a processing system similar to the processing system 10 shown in FIG. 1.

In use, the end station 3 is adapted to communicate with other end station 3, or the base station 1 to allow games of the type described process to be implemented. Accordingly, it will be appreciated that if the communications network 2 is the Internet, this may be typically be achieved by having the base station 1 present web pages to users of the end stations 3. Accordingly, the end station 3 is typically in the form of a personal computer, lap-top, hand-held PC, mobile phone, or the like, which is typically operating applications software to enable data transfer and in some cases web-browsing.

This form of architecture allows the game to be played as a multiple player game, with each game player being associated with a respective character in a single game. This allows the game to be played as a team game, with the characters acting together to complete the game. In this case, each game player may be expected to answer all of the questions, or alternatively, the game players may answer the questions as a team.

In any event, it will be appreciated that this may be achieved by having the end stations 3 communicate with each other directly, or alternatively the game may be hosted on the base station 1, which will also typically include a processing system similar to the processing system 10 operating as a server, or the like.

In this case, it will be appreciated that access to the process may be controlled using a subscription system or the like, which requires the payment of a fee to access a web site hosting the game. This may be achieved using a password system or the like, as will be appreciated by persons skilled in the art.

This allows the game to be linked worldwide so children become involved to challenge other children from different schools/cities/states/countries.

In addition to this, as the game is used throughout the world, feed-back on the game from game users will allow the game to can be updated, with these updates being supplied by the base station 1, typically via a respective web-site, which may also provide marketing information, or the like. It will be appreciated that updates may be free, or in return for a fee, depending on the game license held by the game owner.

Accordingly, it will be appreciated that the above describes a method by which a game may be created, such that when played, the game will help teach the game player regarding specific diseases and their effect on the human body.

The advantage of this compared to normal learning techniques is that children rapidly become bored with standard techniques, and as a result tend to not absorb information. However, children are incredibly receptive to computer games, and can demonstrate incredible concentration when the game interests them.

Accordingly, the invention operates by providing a game which will absorb the game player. However, in order to complete the game, the player will be instructed and then need to demonstrate acquired knowledge. This, will mean that the children will be learning even though playing a game. Furthermore, the amount of instruction can be at a reasonably low level, with this being supplemented by reinforcement of key principles throughout the game, as mentioned above.

The intention of this is that by educating the children in a fun manner in which the characters wish to participate, this will increase awareness of respective conditions and how the characters may be prevented, thereby reducing the overall incidents of the conditions within society.

By educating children in a fun environment, this encourages learning, while from the children's perspective, the characters are able to play games, which are usually considered detrimental to their education.

By allowing children to play a computer generated game during school and with both their teachers and parents blessing, this will encourage children to use the game, and hence learn about conditions affecting the body, such as obesity. In particular, the use of fun and competitive spirit will encourage children, or other individuals, to compete. Furthermore, with success being knowledge driven, rather than requiring physical athletic skills, or the like, this makes the game appeal to a wide range of children.

In particular, by taking children away from their common method of learning into a place where gender or physique is not a feared issue, there is no self esteem pressure from peers to conform to another individuals physical capabilities but instead they will compete against their own learning ability.

By teaching the game players about conditions, the cause and treatment, this will encourage game players to persue a healthier lifestyle that will work hand in hand with activity groups and sporting bodies.

They will learn how to lead more active lives and this project could be linked to a web-site where events and activities promotions could be advised.

Thus, the system provides a learning environment in a delivery platform (computer game) that children can understand (must be FUN education), combination of learning (still challenge their knowledge and mental process) with character role models to provide guidance to the game player during the game.

Persons skilled in the art will appreciate that numerous variations and modifications will become apparent. All such variations and modifications which become apparent to persons skilled in the art, should be considered to fall within the spirit and scope that the invention broadly appearing before described.

APPENDIX A

An example of a script or story-line for a game will now be described. In this example, the game is specifically intended to teach the game player about the effects of obesity, and give the game player an understanding of techniques for preventing or overcoming obesity.

A. Overview

At the beginning of the "game" it will be explained to the game player that the ultimate "end goal game" is a competition against the main adversary, which in this example is the evil AG (Awesome Guy), using a game machine developed by the game player during play.

This may be in the format of a car or bike race, with the standard of car used by the game player depending on the knowledge demonstrated during the game. Thus, for example the appearance or power rating of the car may depend on the number of questions answered correctly.

In any event, it is the purpose of the game that the game player will construct their own game machine and this will typically be achieved by analogy to putting together a human body, thereby allowing the game to teach information regarding the make up of the human body.

The game player will be introduced to their game guides—which in this example are known as the BODY MECHANICS (Insulyn and Glukagon) who will be used during the education process to explain how the body works (including tours) and what is their hormonal "superhero roles" (They also meet the "evil" third element Kortizol).

This section will be along the lines of the fantastic voyage—through the body—and can include:
  A trip around the body; and
  How do nutrients get to my muscles
  Why does my heart beat faster when I am active—what happens when I am not
  How do my muscles work
  What happens when I eat or drink—what happens when I don't The game will designed NOT to promote body perfection but to create a stimulating challenging opponent, for promoting the healthier lifestyle habits. It will be appreciated that there may be licensing, sponsorship and merchandising associated with the characters.

In any event, the game player may then read a section on topics relating to:
  Your Human Body Instruction Manual (Learning of how the machine works)
  Getting yourself roadworthy (Self Health assessment)
  What type of FUEL works best or SUPER UNLEADED OR DIESEL (Food)
  Getting ready for the human race or the Human Machine in motion (Training)
  Get out on the highway or FAST Lane or SLOW Lane (Active Lifestyle benefits)

The game player will take a series of multiple choice quizzes in each section, thereby earning the right to save the host body which forms the game zone. During the entire game, the status of the human body game zone can show responses mimicking those of the actual human body. Thus, the game zone human body can show responses that actually happen when you are active—heart rate increase/blood pressure/body temperature and ultimately, performance eg: if you only get 60% right you only compete that long in an event. While it will be appreciated that a wide range of implementations are within the scope of this example, a specific example of the story line of a game for teaching children about obesity will now be described.

B. The Story

A specific story line will now be described. This involves the following characters:

Virtual You (VY)—Player of the game; Special Operation Team leader

Dr. Bludd or Dr Geoff Lean—Cardiologist doctor treating the patient, also head of Mission Control (MC).

John Decayd or John Dough—Patient who is suffering from obesity.

Special Operations Team (SOT)—Team sent in to fight obesity. Includes Virtual You, Insulyn, and Glukagon.

Sara Bellum—A member of the VOK who helps the SOT.

Glukagon—Monitor's levels of available energy.

Insulyn—Stores excess energy from the blood stream back to the liver as glycogen.

Special Operations Team (SOT/Body Mechanics (BM))—Team sent in to fight obesity. Includes Virtual You, Insulyn, and Glukagon.

White Blood Cells (WBC)—Part of the immune system; help fight disease.

Red Blood Cells (RBC)—Carry white sacs of Oxygen.

Oxygen (O2)—Required for energy (Fuel).

Anti-Oxidantz—Helps to fight Free Radicals when released from the lower intestines as it is gathered from food consumed.

Body Resistance Fighters (BRF)—Repair work on vessel walls.

Fuel Cells—High quality protein nutrition source, usually in the form of glucose.

Kortex—Situated in the VOK, a guardian of ages.

Tryptophan—Guardian of the BBB, is an essential amino acid, meaning that the body cannot manufacture it. The body has to get tryptophan and other essential amino acids from food. Tryptophan helps the body produce the B-vitamin niacin, which, in turn, helps the body produce serotonin.

Serotonin—Another guardian of the BBB a chemical that acts as a calming agent in the brain.

AG—Commander of Obeez City.

Kortizol—An agent of the CHD, Evil Stress Lord, second in command to AG, who causes high blood pressure.

Diabeetz—Makes body cells ineffective at taking up available glucose, therefore the blood glucose levels read at critically high levels.

Free Radicalz—AG's foot soldiers; responsible for suppressing immunity.

Col Esterol—Also known as Mr. Freeze and is responsible for rising level of cholesterol, another agent of the CHD.

Sir O'sis—Damages the liver as the result of excessive alcohol consumption.

Addy Pose—Guardian of the maze of walls around Obeez City.

Ang Ina—Anther agent of the CHD; cooperates with Col Esterol.

Locations in the game zone include:

Critical Zone—The area of most concern for the health of the patient, which will change as each crisis appears and is dealt with.

Vault of Knowledge (VOK)—Otherwise known as the brain, the questions answered here help to gain advice for the SOT and supplies.

CHD—Coalition of Harm and Disease or the Coronary Heart Disease

Femoral Artery—Main artery in the leg of the body

Obeez City—The site of obesity in the body, which is very dangerous place as the toxic waste is very acidic Body Head Quarters (HQ)—Located in the pancreas.

Fuel Cell Storage Silo (Liver)—Stores some energy (glycogen).

Iliac Vein—Major blood flow return from the lower limbs back towards the heart.

Hepatic Artery—Artery the supplies the liver.

Kidneys—Filtration system

Waist Lands—Surround Obeez City

Four Chambers (of the heart)—Left and Right atrium and ventricles.

Docking stations—aveoli in the compressor.

Compressor—Lungs.

BBB—The Blood-Brain Barrier.

Other elements include:

Health Probe—Vehicle used by SOT to travel around the body

HUD—Monitors SOT energy status

Amino Ray—Can be acquired from VOK and used to fight the effects of damage by Korticol.

Bio-Report—Usually sent back to the doctor with necessary data.

Arterial Shunt—Reinforces extensive damage done to the walls of the femoral artery.

Shunt Kit—Gained in VOK, which helps to seal damaged vessels.

Water (H2O)—Used for hydration of the body.

Stroke—Cerebral (brain) haemorrhage

A summary of each level in the story will now be described.

1. Level 1—"High Blood Pressure and Minor Stroke"

In this level a critically ill patient requires treatment in the ER and is being treated by the doctor who is the Mission Controller and a member of the Ministry of HEALTH, (Hospital Emergencies Against Lifestyles That Harm). Treatment requires the game player (Virtual You) to enter the body on a life or death mission to save the patient.

Virtual You will be assisted primarily by the hormone "superheroes", Insulyn and Glukagon, who will fill the other roles of members on the Special Operations Team to fight AG and his allies, the Agents of CHD.

This part of the mission will require Virtual You to successfully answer a series of questions in the Vault of Knowledge (VOK), where they meet KorTex, who will guide them on their quest and allow them to overcome the areas of the body affected by high blood pressure being caused by Kortizol.

Other areas of concern will be faced as the body has previously suffered a minor stroke. These conditions could lead to the death of the patient unless Virtual You and the superheroes can establish a healthier body for him to live in.

2. Level 2—"Diabetes and Vascular Disease"

In this level Virtual You will be assisted only by Glukagon as Insulyn becomes less effective after a surprise encounter with Diabeetez, and is taken prisoner by Diabeetez. Insulyn is transported into the Waist Lands by the Agents of CHD, attempting to convert him to the dark side, and is put to work on a "chain gang" assisting them to lay down fat barriers.

During this part of the mission SOT again need to gather knowledge to overcome the areas of the body affected—eyes (bomb planted by Diabeetez on the optic nerve), kidneys (attacked by Free Radicals) and lower limbs (Kortizol is again causing vascular problems), and also they encounter a problem in the Health Probe that requires a trip to the lungs to allow for a carbon dioxide/O2 transfer.

The team will also need to re-fuel the Health Probe and themselves, to covertly enter the Waist Lands to rescue Insulyn (this will be their first encounter with Addy Pose), as illness continues to ravage the body primarily with Diabetes and vascular related problems.

Concern will be even more elevated (Threat Level—High) as the forces of illness under the guidance of AG mass to confront the body's defensive network (immune system) by increasing Free Radicalz damage. In response to this under the guidance of Mission Control, Virtual You will be assisted by the Anti-Oxidantz.

Again conditions could lead to the death of the patient as the superheroes continue to establish a healthy body for him to live in.

3. Level 3—"CHD—Coronary Heart Disease"

In this level Virtual You is assisted by both Glukagon and Insulyn (will unknowingly be working as a double agent). The patient regains consciousness and the doctor indicates the patient needs to undertake some physical rehab activity, which will be required to re-enforce the health gains made by the efforts of the SOT.

On this mission the SOT will need to gain knowledge to overcome the problem of high cholesterol causing blockage of the coronary arteries (Threat Level Critical) primarily affecting areas of the Four Chambers and then deal with it and the agents causing the problems.

While undertaking the incidental activity (walking on a treadmill), the patient experiences shortness of breath and severe chest pain, which is being caused by Col Esterol and his co-partner Ang Ina.

The Doctor then realizes that the patient is suffering a heart attack and the health scan and ECG are showing these symptoms. This is confirmed by the team's HUD showing the patient experiencing difficulties inside the body and a requirement to go to the four Chambers.

Sara Bellum, who'd been tasked with getting the patient active, has been kidnapped by the Free Radicals and has been taken to Obeez City where she is now being held prisoner by AG. This makes it impossible for the patient to be active as all motor control is under the control of Sara Bellum. AG believes if he can knock out the driver of activity he'll defeat the SOT once and for all. The Team members realize that Sara is critical to their mission and the only way that the patient can be saved in the long term is if they can rescue Sara Bellum from the clutches of AG in Obeez City and get the patient active once again.

The team have to go into Obeez City and attempt to reduce the overall damage and cope with the elevated levels of LDL cholesterol that have been laid down by Col Esterol.

Again conditions could lead to the death of the patient, who again lies unconscious, as the SOT attempt to establish a healthy body for him to live in.

4. Level 4—"the Ultimate Hand to Hand Battle Against AG"

In this level Virtual You attempts to defeat illness once and for all in the body of the patient. On this mission Virtual You will need to complete this alone, rescue the beautiful Sara Bellum and get the patient active once more.

Again Virtual You will have to seek knowledge in the VOK where guidance will be given for the final time by KorTex for the ongoing quest. It is here that KorTex relieves that Sara Bellum is in fact his daughter and entrusts VY with her safe return, It is a mission that VY simply cannot afford to fail in, if he/she does it will result in the loss of Sara Bellum and the resultant death of the patient.

Leaving the VOK, Virtual You will have to travel through the body to arrive at the entrance to the Waist Lands. Upon arriving there, a covert entrance past Addy Pose, the guardian, will be required to gain access so as AG is not alerted early to the presence of intruders inside Obeez City.

Once Virtual You is inside the city, the real battle with illness will begin as a martial arts fight against AG will ensue in a one on one scenario to save Sara Bellum who hangs precariously over a vat of boiling fat. Each wrong answer VY completed in the VOK during this level will bring Sara closer and closer to her doom because AG has the ability to swap between fighting styles and weapons at will. VY must have acquired all of these fighting skills and weapons in the VOK otherwise AG will simply adopt a style/weapon which VY is not familiar or equipped with and defeat the player plunging Sara Bellum into the vat of boiling fat dooming the patient to death in the process.

With the knowledge Virtual You gains inside the VOK, skills in all the various types of martial arts will be acquired and also be personally armed with the necessary weaponry to encounter the arch enemy AG.

This will lead to the ultimate showdown of good vs evil and lead to the destruction of AG and ultimately Obeez City with a resulting healthier host body for the patient to inhabit.

If Virtual You is defeated by AG then the death of Sara Bellum and ultimately the patient will result and it's GAME OVER!

C. Level 1—Detail

The operation of the game in level 1 will now be described in more detail. Virtual You arrives in a game play area representing the Body HQ, to be met by the superhero hormones, (the Body Resistance Fighters–Insulyn+Glukagon), who assist on this mission.

They greet him introducing themselves, giving brief overview of their capabilities, which can appear on screen as pop up icons or can be part of the lead-up to the game release with game cards and website support or the like.

A Health Probe vehicle is provided for use to travel around the body. In it's current form, lacks someone to pilot it, sufficient fuel to complete the full mission, adequate armor and weapons to defeat their enemy, so all agree that a rapid action is required.

Insulyn and Glukagon know that Sara Bellum, who can be found in the VOK, will be able to help them out with the final fit out of the Health Probe to get it combat ready, but to date they haven't been able to establish communications with the VOK due to damage that has been caused to the VOK's communications system by the previous cerebral hemorrhage suffered by the patient.

The only way to get the Health Probe fully equipped is to travel to the VOK and meet up with KorTex and Sara Bellum. However, given the attack that the VOK has been under security at the VOK has been beefed up considerably so access is difficult across the force-field that has been erected—the Blood Brain Barrier. Only those with the necessary knowledge will be able to access the VOK to arm and fuel the Health Probe with KorTex's and Sara Bellum's assistance.

Accordingly, the user must navigate the vehicle via the Four Chambers to gather the required data to arm, fuel and protect themselves and the HP. They will use the Bloodstream to travel around the body and this will also be another way they explore the body.

Departing the Pancreas and entering the major nutrient pathway the user must head along the Bloodstream (which appears as a blue pathway during this stage). Once in the bloodstream the player manoeuvres the HP to avoid red/white blood cells and fuel cells along the way. During this process SOT's view pariah style parasites in the bloodstream are fighting with white blood cells. The doctor advises that this is a virus that the body's immune system WBC's, are battling. It is only a low-grade infection and the white blood cells should have it in hand soon enough.

During the start of the journey they encounter numerous "objects" in the blood stream representing Fuel Cells, which must be gathered later in the mission to provide energy and to fuel the HP, as well as RBC's that have depleted cluster levels of oxygen or O2, which are transporting carbon dioxide back to the docking stations in the body's compressor to dump the CO2 and pick up some fresh O2. As they travel along the RBC become progressively bluer and the amount of CO2 bound to them increases.

Using a basic map fed into the HP from Mission Control, the player controls the HP to enter the inferior vena cava. Due to fuel levels, O2 concentrations, etc. within the Health Probe the shortest possible route to get to the VOK to equip themselves.

When entering the Four Chambers via the right atria, then into the right ventricle, The valve damage is viewed and reported back to the doctor, who comments that this is something that will need to be attended to later on, but for the time being they need to focus on the task at hand—getting the Probe fuelled and equipped. They then exit the right ventricle into the pulmonary artery and are pumped up into the lungs via arterioles and capillaries.

The game zone displays alveoli air sacks, where the exchange of CO2/O2 is occurring and blue blood, now appears to be red blood, indicating that the bloodstream is flooded with ample supplies of O2 as oxygen exchange is taking place.

The HP travels forward as the path widens to venuoles, then increase in size to the pulmonary vein draining back into the Four Chambers, left atria into left ventricle, then the HP is pumped out of the aorta via systemic circulation, taking ascending aorta to the VOK.

Upon approach to the VOK, the gaming zone shows large sections of the exterior of the VOK appear to have suffered damage and the doctor informs them that the patient may have suffered an earlier complication of a minor stroke, which is why Glukagon and Insulyn have been unable to communicate with Kor Tex or Sera Bellum. This represents a prior cerebral hemorrhage.

To enter the VOK the user controls the character to cross the Blood Brain Barrier (BBB). To achieve the user must use a Fuel Cell, the only thing that is permitted to cross the BBB. After two attempts to get in without successfully boarding a Fuel Cell, then a pop-up icon appears with some hints about Fuel Cells being the only substance that can travel across the BBB. VY then earns entry into the VOK by answering an initial question to establish worthiness to proceed.

The VOK is a dark, fortress and appears to be protected by intermittent electric currents that race across the surface, except for the damaged area. The doctor explains that this is the brain synapses firing with any thoughts from the patient, and although unconscious the brain is still active. VOK could be grey in colour (made up of grey matter) and the walls are constructed in such away that you can see the folds and fissures that make up brain tissue.

The entrance is fronted by two very large doors that only open partially allowing the entry of the Fuel Cells. Protected by the Guardians of the BBB—Serotonin and Tryptophan, providing an invisible barrier—which is a secure path only accessed by blood flow. At this point a demonstration is provided showing what happens to an "unworthy" aspirant that tries to cross the BBB (for example, one of the piranha type viruses could try to enter the brain and be torn to bits by Tryptophan and Serotonin). Thus, this indicates to the user that they must answer the health question correctly, which then allows a Fuel Cell to be used to access the VOK.

After briefly viewing the Fuel Cells entering the VOK, Virtual You leaves the safety of the HP with the aid of the self contained combat gear, takes two Oxy-Tabs which will assist with breathing for the time inside the VOK. Requiring careful timing, attempts are made to enter. Getting on board the Fuel Cell isn't difficult but Virtual You is repelled when attention is drawn to one of the Guardians of the BBB turning inward to face Virtual You who displays the following:

POP UP ICON—The BBB has several important functions: TRUE OR FALSE

1. Protects the brain from "foreign substances" in the blood that may injure the brain.
2. Protects the brain from hormones and neurotransmitters in the rest of the body.
3. Maintains a constant environment for the brain.

Selecting TRUE, to acquire entry, the user is provided with 3 minutes of time until the air runs out. Inside, the VOK is represented by an old, dark, dusty vault, (which has suffered visible damage from the previous stroke) but includes the information required to save this body. The VOK has a three tiered wall (alcove) stretching upwards as far as the eye can see—ENERGYZONE or Nutrition—POWERZONE or fitness—ENGINEERINGZONE or body structure.

KorTex, the wizard and "Master of the Ages", explains what questions must be answered before the game can continue. In this regard, each section in the VOK, will have boxes numbered 1-5 (or 15 questions each level) with a series of True and False questions. They must answer ALL questions in each section prior to moving onto the next section. There is a time limit monitored so that if the time elapses, any questions not attempted will be forfeited. Example questions are set out below.

NOTE—Depending on which questions have been answered correctly will determine what has been provided. This will automatically show up in the Health Probe and then be able to be displayed on the HUD once Virtual You is inside.

Answer all the questions correctly at Level One and Kor Tex considers VY "the Chosen One" and introduces him to Sara Bellum and entrusts VY with her safety. She has the know-how to help fuel the Health Probe—she has the knowledge that the Probe uses Fuel Cells—and can also tell VY which weapon system to use against which adversary. It is possible to progress without her support, but as no instructions will be provided it is difficult to respond correctly, and death is the usual outcome. Thus it will be seen that skills, weapons, etc. are accumulated by correctly answering questions at each level.

Armed with (potential) knowledge and (potential) health weapons, the user is returned to the HP, and proceeds to the first health crisis.

Utilizing the body map and further guided by the doctor in Mission Control the user retraces their journey through the Four Chambers and down via the bloodstream (descending aorta) to get to the Outer Extremities of the game zone which represent lower limbs which are poorly supplied by blood because of the obesity problem and vessel degeneration.

The user must deal with elevated blood pressure in the Outer Extremities, which is represented by Kortizol causing havoc in the body with high stress levels and elevated blood pressure by "breaching" the walls of some of the blood vessels in the Outer Extremities and this is causing blood pressure problems, monitored on the HUD. If the user doesn't get there in time they didn't answer the necessary question correctly BP will continue to rise until irreversible damage occurs to the blood vessels and death occurs—game over.

As the user navigates towards the crisis zone, increased turbulence is felt strongly in the HP, causing sensor alarms to go off with loud sounds of increased rushing noise heard, which makes traveling towards the area more difficult. They will require them to activate "stabilizers" if they have acquired this device by answering the right question in the V.O.K, without these stabilizers the Health Probe will career out of control and crash→game over. With the stabilizers available the SOT will be able to proceed.

The user navigates along the major femoral artery path, which looks like a rushing stream through a canyon, they activate the Stealth Mode (if gained in the VOK) so as not to alert Kortizol, who using his scythes/talons to damage the walls of the bloodstream, restricting the flow of blood which is forcing increased pressure response back towards the heart. Without Stealth Mode Kortizol can turn destroy the HP resulting in death and the end of game. Sara Bellum will therefore instruct the team to engage Stealth Mode upon approach and select the Amino Ray with which to engage Kortizol, which is achieved by shooting the respective character using the ray weapon.

There is potential danger when Sensors sound in the HP. It is shown what happens inside the body as stress is experienced, which is another obesity-related disease.

During this process it becomes evident that forward progress is being hindered and MC indicates there is severe dehydration, combined with the increased blood pressure is causing congestion for the HP and it's occupants. The effects of dehydration on the body are shown on the screen.

The doctor advises to drink more water. The body is hydrated, which will take a short time to arrive but will soon make travel that much easier. As they arrive in the area they view the damage, and decide they need to begin damage control initiatives quickly.

They start to lay down a barrage of covering shots from the Amino Ray which limits the further damage being able to be caused. With time, this area will recover and allow for restoration of blood flow. This barrage as well as assisting repair also wards off Kortizol, who flees for the safety of Obeez City to report back to his commander AG of the lack of success of his mission.

SOT sends an internal Bio-Report back to the doctor containing the necessary data who then provides feedback to the HP on the updated health status of the patient (his body will morph as health improves/or die as they lose the game of life).

An alarm sounds simultaneously in both the HP and MC, which explains to the user that maintenance "shots" are required as the elevated blood pressure problems may have caused further ruptures in the walls of the VOK and stroke like symptoms, as viewed on the initial approach to the VOK, may result in valuable knowledge being lost.

There are at least two possible scenarios. An Arterial shunt to reinforce the extensive damage done to the walls of the femoral artery by Kortizol can be used. If VY didn't answer the question correctly in the VOK and the arterial shunt isn't acquired the damage that had already been done by Kortizol would result in the walls of the femoral artery breaching and the patient hemorrhaging to death—Game Over. Alternatively, before departing the area, the user is advised to perform repair work on the vessel walls using a Shunt Kit.

On completion the user controls the HP to travel back along the bloodstream towards Body HQ. Typically at this point the user must acquire the Fuel Cells to continue their mission and that a diversion to the Fuel Cell storage silo is required to release some stored energy. At this time the uiser is instructed that the storage silo is the only other place, aside from the blood stream, that Fuel Cells can be acquired.

Again the user retraces their journey using the body map, noting that on their return there is a huge pathway ahead, the iliac vein. They take the abdominal pathway and head past the Body HQ and linking up with the "hepatic artery" head to the Fuel Cell storage silo.

The liver is also the toxic waste processing plant—that is why alcohol damages liver. Plus the Kidneys have also experienced damage, which is indicated to be caused by Sir O'sis. The user controls a "drag hook" to catch the end point which will cause the net to break its confines and release the nutrients into the blood stream to energize the body, the HP and also its occupants.

As they successfully negotiate the manoeuvre, they loop back to encounter Fuel Cells racing into the body. Taking what is required, they head back to the HQ.

During their return trip, they get notified that they have to cope with another crisis. They learn from MC that the patient's body has been unexpectedly flooded with nutrients, caused by Diabeetz, which has made the bodies cells ineffective at taking up the available glucose and blood glucose levels are reaching critically high levels which can lead to vascular and kidney problems and eye damage.

Excess Fuel cells are flooding the bloodstream to such a state that levels are causing concern and Insulyn is instructed to depart the team (and their completed mission), to store the excess energy from the blood stream back to the liver as glycogen.

Due to the excessive amount of nutrients flooding the bloodstream, Insulyn finds himself being overworked as the numbers of nutrients being stored are reduced and so to do the numbers of "Insulyns". This is reflective of the way in which the body reacts when a meal is eaten, that the way the body reacts to carbohydrates, protein, and fat, which generally cause an "Insulin" response.

The user continues to receive reports of other emergencies arising out in the body where the Free Radicalz are mounting an offensive on cells of the body with a suppressed immunity caused by the illness affected body. The WBC are overwhelmed by the Free Radicalz which is reaping havoc on the body's immune system. The user must therefore combat the Free Radicalz with an influx of Anti-Oxidantz. They report this back to Mission Control.

This could lead to possible infection and ultimately the return of Diabeetez. There is a clear indication that Diabeetz has been at work already, because the body's cells have been unable to uptake the available Fuel Cells and Insulyn is working overtime (and ineffectively) to overcome this problem. MC is concerned about this and has dispatched the Anti Oxidantz to mobilise and assist with limiting damage being caused and also to improve immune function by aiding the WBC. This element must be controlled or other health issues will ravage the body.

During this process Insulyn is captured by Diabeetz and taken to Obeez City, which must be counteracted in level 2 by returning to the VOK to seek more equipment and knowledge.

Examples of questions that may be used include:

Nutrition/Energy

1. Cholesterol has two parts:
   a. HDL (high density lipoprotein)—which is "good" cholesterol
   b. HDL—which is "bad" cholesterol.
   c. LDL (low density lipoprotein)—which is "good" cholesterol
   d. LDL—is "bad" cholesterol and HDL is "good" cholesterol.
2. All cholesterol is:
   a. All bad and we shouldn't have any of it in our blood.
   b. Is necessary for the formation of various hormones within the body.
   c. Has no relationship whatsoever with CHD and high blood pressure.
   d. Solely related to how much fat you eat.
3. We can lower our overall cholesterol levels and improve our cholesterol profile by:

a. Eating more leafy green vegetables.
b. Only consuming milk in moderation.
c. Eating fish (particularly the deep-sea/cold water variety) at least twice a week.
d. Cholesterol levels are genetically predetermined so that what you are born with you are stuck with.

4. The National Heart Foundation recommends that a healthy range for total cholesterol is:
a. Lower than 5.5 mmol
b. Lower than 6.0 mmol
c. Lower than 6.5 mmol
d. The NHF doesn't set a range because it can't be changed.

5. If a person has a history of high cholesterol and no exercise background the characters should:
a. Start exercising as soon as possible, this is the only way to help improve their cholesterol profile.
b. Have a full medical examination with a doctor before starting to exercise.
c. Eat less fat, wait 6 weeks and then start exercising.
d. Never exercise and rest.

Fitness/Power

6. Fats can be either saturated or unsaturated. The following statement is more accurate in relation to fats:
a. The characters are "bad" and every effort should be made to eliminate them from your diet.
b. Saturated fats aren't really a problem, it is the unsaturated fats we need to be careful of.
c. Saturated fats are generally of a plant origin.
d. Unsaturated fats are generally of a plant origin and actually have some beneficial effects on your heart.

7. To lower your intake of saturated fats you could:
a. Reduce your consumption of commercially produced baked goods like pies and pasties.
b. Decrease your intake of high fat takeaway/convenience foods.
c. Use low-fat alternative diary products.
d. All of the above.

8. If someone wants to decrease body fat the characters should be exercising at a low heart rate which is approximately:
a. 70-75% of maximal.
b. 80-85% of maximal.
c. 90-95% of maximal.
d. It doesn't really matter—any exercise will do.

9. One kilogram of body fat is equivalent to:
a. 7700 calories
b. 3500 calories
c. 770 calories
d. 350 calories Structure/Engineering 10. As women and men age there is naturally an increased incidence of:
a. coronary heart disease and cancer.
b. high blood pressure.
c. Diabetes
d. None of the above.

11. Children you shouldn't start a formal exercise program until:
a. The characters reach adolescence.
b. Are capable of lifting their own body weight.
c. There bones have "set"
d. None of the above.

12. Since children have a degree of "natural" fitness it is:
a. unnecessary to teach them healthy eating habits at a young age because the characters simply burn the extra calories off anyway.
b. the characters don't need to exercise because their natural fitness doesn't start to decrease until adolescence.
c. easier for them to adapt to exercise than adults.
d. a good idea to get them involved in activity at an early age so that it becomes a natural part of their life in the longer term.

13. Exercise can reduce blood pressure by:
a. Lowering certain hormones in the body that constrict blood vessels.
b. Increasing the width of some blood vessels.
c. Helping to reduce body weight and blood lipid profiles.
d. All of the above.

14. "Osteoporosis" refers to:
a. ankle problems
b. a thinning of the bones as a consequence of a loss of bone mineral (calcium) deposition.
c. breaking bones.
d. knee problems.

15. Exercise can help offset the incidence of osteoporosis by:
a. Stimulating/maintaining bone deposition as a consequence of muscular contraction.
b. Forcing you to crave better foods that are rich in calcium
c. This is a fallacy, exercise has no effect on the effects on osteoporosis.
d. Decreasing your body weight which subsequently puts less stress on your bones.

Example of true/false answer questions are as follows:
Another name for high blood pressure is hypertension. (T)
Regular aerobic exercise will not help improve a persons blood pressure profile. (F)
If a person already has high blood pressure they should eat more salt to help overcome the problem. (F)
A normal blood pressure reading is around 120/80. (T)
Blood pressure is a measure of the pressure acting on the walls of the blood vessels. (T)
The systolic blood pressure refers to the pressure in the blood vessels when the heart pumps. (T)
The diastolic blood pressure refers to the pressure in the blood vessels when the heart relaxes. (T)
High blood pressure is defined as being greater than 145/95. (T)
Regular physical activity is thought to lower blood pressure by lowering the levels of certain hormones in the blood which normally tend to constrict the blood vessels. (T)
Regular physical activity is thought to lower blood pressure by increasing the width of some blood vessels therefore reducing overall blood pressure. (T)
Regular physical activity is thought to lower blood pressure by lowering overall body weight and improving a person's blood lipid profile. (T)
Blood pressure isn't affected by a person standing, lying or exercising. (F)
Emotion, stress, pain and sleep all affect blood pressure. (T)
High blood pressure means that the heart has to work harder to pump the blood around the body. (T)
High blood pressure can lead to heart attack. (T)
High blood pressure can lead to stroke. (T)
High blood pressure can lead to heart failure. (T)
*High blood pressure can lead to kidney disease. (T)
High blood pressure can lead to eye problems. (T)
Lifestyle changes, like getting more exercise and lowering your salt intake wont lower your blood pressure. (F)
High blood pressure is the leading cause of strokes. (T)

Having a systolic blood pressure of more than 160 mmHg increases the chance of coronary heart disease 2-3 times. (T)

Having a systolic blood pressure of more than 160 mmHg increases the chance thrombosis up to 7 times. (T)

High blood pressure increases the thickness of the arterial walls. (T)

High blood pressure makes the arterial walls less flexible. (T)

High blood pressure promotes atherosclerosis (a build up of fatty deposits and fibrous materials) on the artery walls eventually impairing blood flow to tissues. (T)

Weight loss will not help lower blood pressure. (F)

Lowering alcohol intake can help to lower blood pressure. (T)

Stress is a major cause of high blood pressure. (T)

Salt intake plays no role in the control of hypertension. (T)

Physical activity can reduce blood pressure by lowering certain hormones in the body that constrict blood vessels. (T)

Physical activity can reduce blood pressure by increasing the width of some blood vessels. (T)

Physical activity can reduce blood pressure by helping to reduce body weight and blood lipid profiles. (T)

The glycaemic index is a fancy way of measuring blood pressure. (F)

It will be appreciated that this is a preferred example of an implementation of a game according to the invention.

What is claimed is:

1. A game for teaching a user about conditions affecting the human body, the game comprising:
    a game zone representing a body inflicted with a condition;
    a number of opponents, wherein at least one of the opponents is an enemy character in the game, the opponents representing attributes of the condition;
    a character representing the user;
    a number of questions, the user being required to supply answers to the questions;
    one or more weapons for overcoming the opponents, the weapons being opponent specific such that a weapon would only affect a predetermined opponent, the weapons being awarded to the character in response to the user demonstrating a level of knowledge corresponding to a number of correctly answered questions, the user being able to control the character to use the weapons against the opponents;
    a story-line representing the progression of the condition, the character being required to eliminate at least some of the opponents in order to allow the user to overcome the condition and win the game, wherein overcoming a sufficient number of opponents to overcome the condition represents the victory of the user and the recovery of the body, wherein failure to overcome a sufficient number of opponents to overcome the condition represents victory of the disease; and,
    wherein the game is generated by a processing system and is embodied on a non-transitory computer readable medium.

2. The game of claim 1, at least some of the weapons being associated with respective cure attributes for overcoming a disease.

3. The game of claim 2, the weapons associated with respective cure attributes being awarded in response to answering a question about the respective cure attribute.

4. The game of claim 1, the game comprising a number of levels.

5. The game of claim 4, each level being set in a different region of the body.

6. The game of claim 5, each level comprising opponents corresponding to a respective aspect of the condition.

7. The game of claim 1, the game further comprising a knowledge center accessible by the user, the knowledge center comprising at least sufficient information to allow the questions to be answered.

8. The game of claim 7, the knowledge center comprising references to external materials.

9. The game of claim 7, the knowledge center comprising redundant materials.

10. The game of claim 1, the game being implemented using a processing system, the processing system comprising:
    a non-transitory data storage medium configured to store game data representing the game;
    an input configured to receive input commands from the user;
    a display configured to provide a game representation to the user; and,
    a processor, the processor being adapted to:
        determine a current game status;
        generate an image in accordance with the current game status, the image being displayed on the display;
        modify the games status in accordance with input commands received from the user; and,
        repeat steps (ii) and (iii) as required.

11. The game of claim 10, the processor being adapted to:
    determine if the condition has overcome the body; and,
    end the game in response to a successful determination.

12. The game of claim 10, the processor being adapted to:
    generate the game zone, the game zone being a three-dimensional representation of the inside of the human body;
    move the character around the game zone in response to input commands from the user; and
    generate an image representing the current location of the character in the body.

13. The game of claim 12, the image being a rendered 3-D image.

14. The game of claim 12, the game zone including one or more knowledge centers provided at respective locations.

15. The game of claim 12, the processor being adapted to:
    periodically generate selected questions;
    present the questions to the user on the display;
    determine any answers in accordance with input commands received from the user;
    determine if any correct answers have been provided; and,
    award the character with one or more weapons in response to a positive determination.

16. The game of claim 12, the game data comprising an indication of the story line, the processor being adapted to update the game status in accordance with the story line.

17. The game of claim 1, the conditions being medical conditions.

18. The game of claim 1, the user being required to gain a knowledge of at least one technique of overcoming the condition in order to win the game.

19. A computer program product for teaching users about conditions affecting the human body, the computer program product comprising executable code which when executed on a suitable processing system causes the processing system to implement a game comprising:
    a game zone representing a body inflicted with a condition;

a number of opponents, wherein at least one of the opponents is an enemy character in the game, the opponents representing attributes of the condition; a character representing the user;

a number of questions, the user being required to supply answers to the questions;

one or more weapons for overcoming the opponents, the weapons being opponent specific such that a weapon would only affect a predetermined opponent, the weapons being awarded to the character in response to the user demonstrating a level of knowledge corresponding to a number of correctly answered questions, the user being able to control the character to use the weapons against the opponents; and, a story-line representing the progression of the condition, the character being required to eliminate at least some of the opponents in order to allow the user to overcome the condition and win the game, wherein overcoming a sufficient number of opponents to overcome the condition represents the victory of the user and the recovery of the body, wherein failure to overcome a sufficient number of opponents to overcome the condition represents victory of the disease; and, wherein the game is generated by a processing system and is embodied on a non-transitory computer readable medium.

20. A method of creating a game for teaching users about conditions affecting the human body, the method comprising defining:

a game zone representing a body inflicted with a condition;

a number of opponents, wherein at least one of the opponents is an enemy character in the game, the opponents representing attributes of the condition;

a character representing the user;

a number of questions, the user being required to supply answers to the questions;

one or more weapons for overcoming the opponents, the weapons being opponent specific such that a weapon would only affect a predetermined opponent, the weapons being awarded to the character in response to the user demonstrating a level of knowledge corresponding to a number of correctly answered questions, the user being able to control the character to use the weapons against the opponents; and a story-line representing the progression of the condition, the character being required to eliminate at least some of the opponents in order to allow the user to overcome the condition and win the game, wherein overcoming a sufficient number of opponents to overcome the condition represents the victory of the user and the recovery of the body, wherein failure to overcome a sufficient number of opponents to overcome the condition represents victory of the disease; and, wherein the game is generated by a processing system.

21. The method of claim 20, the game being defined using a processing system, the method comprising causing the processing system to generate computer executable code which when executed on a suitable processing system cause the processing to implement the game.

22. A computer program product for creating a game for teaching users about conditions affecting the human body, the computer program product comprising executable code which when executed on a suitable processing system causes the processing system to perform a method of creating a game for teaching users about conditions affecting the human body, the method comprising defining:

a game zone representing a body inflicted with a condition;

a number of opponents, wherein at least one of the opponents is an enemy character in the game, the opponents representing attributes of the condition;

a character representing the user;

a number of questions, the user being required to supply answers to the questions;

one or more weapons for overcoming the opponents, the weapons being opponent specific such that a weapon would only affect a predetermined opponent, the weapons being awarded in response to the user demonstrating a level of knowledge corresponding to a number of correctly answered questions; and, a story-line representing the progression of the condition, the character being required to eliminate at least some of the opponents in order to allow the user to overcome the condition and win the game, wherein overcoming a sufficient number of opponents to overcome the condition represents the victory of the user and the recovery of the body, wherein failure to overcome a sufficient number of opponents to overcome the condition represents victory of the disease; and, wherein the game is generated by a processing system and is embodied on a non-transitory computer readable medium.

23. A method of teaching users about conditions affecting the human body, the method comprising causing the users to play a game, the game comprising: a game zone representing a body inflicted with a condition;

a number of opponents, wherein at least one of the opponents is an enemy character in the game, the opponents representing attributes of the condition;

a character representing the user;

a number of questions, the user being required to supply answers to the questions;

one or more weapons for overcoming the opponents, the weapons being opponent specific such that a weapon would only affect a predetermined opponent, the weapons being awarded in response to the user demonstrating a level of knowledge corresponding to a number of correctly answered questions; and, a story-line representing the progression of the condition, the character being required to eliminate at least some of the opponents in order to allow the user to overcome the condition and win the game, wherein overcoming a sufficient number of opponents to overcome the condition represents the victory of the user and the recovery of the body, wherein failure to overcome a sufficient number of opponents to overcome the condition represents victory of the disease; and, wherein the game is generated by a processing system.

* * * * *